United States Patent Office 3,741,942
Patented June 26, 1973

3,741,942
POLYIMIDES
James V. Crivello, Mechanicville, N.Y., assignor to
General Electric Company
No Drawing. Filed July 16, 1971, Ser. No. 163,411
Int. Cl. C08g 20/20
U.S. Cl. 260—78 UA        13 Claims

ABSTRACT OF THE DISCLOSURE

Polyimide compositions are obtained by the reaction of a bisimide and an organic dithiol. The resulting polymeric compositions have physical properties which make them suitable for coating, insulating and molding applications.

---

This invention is concerned with polyimide compositions. More particularly, the invention relates to a polymer composed of recurring structural units of the formula (I)
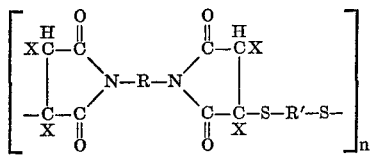

where X is a member selected from the class consisting of hydrogen and the methyl radical, R is a divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms, —S—, —SO$_2$—,

and —O—, R' is a divalent residue of an organic dithiol and can be a divalent organic group, e.g., alkylene, arylene, organic diester, polyvalent heterocyclic, substituted or unsubstituted derivatives of all the foregoing, etc., and $n$ is a whole number in excess of 1, for instance, 2 to 10,000 or more.

The invention also includes methods for making polymeric compositions of Formula I by effecting reaction in the presence of a proton donor between a bis-maleimide of the general formula

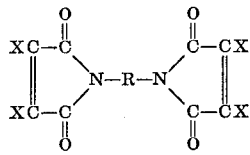

with an organic dithiol of the general formula (III)         HS—R'—SH advantageously in the presence of a solvent for one or both of the reactants and for the reaction product where X, R, and R' have the meanings given above. The above-identified compositions of Formula I can also be made by forming an aqueous emulsion of the bisimide of Formula II and thereafter interreacting the latter with the organic dithiol of Formula III.

The term "proton (H+) donor" is intended to mean any compound, whether organic or inorganic, capable of ionizing to give a proton and includes, for instance, inorganic acids (e.g., HCl, HClO$_4$, H$_3$PO$_4$, H$_2$SO$_4$, etc.); organic carboxylic acids (e.g., formic acid, acetic acid, propionic acid, benzoic acid, isobutyric acid, trifluoroacetic acid, maleic acid, etc.); organic compounds containing weakly acidic hydrogen atoms in the form of nuclearly bonded hyroxyl groups (e.g., phenol and substituted phenols, including mesitol, cresol, xylenol, hydroquinone, etc.); acidic inorganic and organic salts (e.g., ammonium chloride, ammonium bromide, trialkyl ammonium salts, for instance, tributyl ammonium chloride, etc.); etc.

The amount of the proton donor can be varied widely. Generally, it is present in an amount sufficient to suppress the competing anionic polymerization leading to the gel stage. Based on the weight of the bis-maleimide, the proton donor may range from 0.5 to 10% by weight, or more. If desired, the acidic proton donor can be present in larger amounts so as also to act as the reaction medium, for instance, in connection with the use of materials such as acetic acid, cresol, etc.

The bis-imides of Formula II may be prepared by effecting reaction between a diamino compound of the formula (IV)         NH$_2$—R—NH$_2$ and an anhydride of the general formula (V)
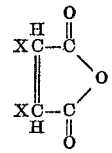

where R and X have the meanings given above. In practice, the compositions of Formula II may be obtained by effecting reaction in a well known fashion between 2 mols of the anhydride of Formula V and the diamino compound of Formula IV. Among the anhydrides of Formula V which may be employed are, for instance, maleic anhydride, citraconic anhydride, and dimethyl maleic anhydride (pyrocinchonic anhydride).

The bis-imides of the general Formula II can be varied widely depending on the kinds of organic radicals which are present therein. Among the divalent groupings which R may broadly and more specifically represent are, for instance, divalent saturated alkylene radicals of up to 40 carbon atoms, for instance, 1 to 10 (e.g., ethylene, propylene, butylene, isopropylidene, hexylene, cyclohexylene, etc.), the divalent radical of diethylene oxide of the formula —CH$_2$—CH$_2$—O—CH$_2$—CH$_2$— etc.); arylene including various isomers thereof (e.g., m-phenylene, p-phenylene, p,p'-biphenylene, m,m'-biphenylene, dichlorophenylene, biphenylene methylene of the formula

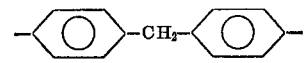

biphenylene oxide, biphenylene sulfone, biphenylene sulfide, keto biphenylene of the formula

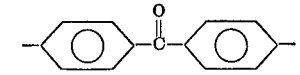

etc.), etc. Obviously, the arylene radicals may be attached to nitrogens through the ortho, meta or para positions.

Typical examples of the bis-imides of Formula II which may be treated with the organic dithiol are, for instance, N,N'-ethylene-bis-maleimide, N,N'-m-phenylene-bis-maleimide, N,N'-p-phenylene-bis-maleimide, N,N'-hexamethylene-bis-maleimide, N,N'-p,p'-diphenylmethane-bis - maleimide (hereafter referred to as "BMI"), N,N'-p,p'-diphenylether-bis-maleimide, N,N'-p,p' - diphenylthioether-bis-maleimide, N,N'-p,p'-diphenylsulfone-bis - maleimide, N,N'-4,4-dicyclohexylmethane-bis-maleimide, N,N' - m-xylylene-bis-maleimide, N,N'-p,p' - benzophenone - bis-maleimide, N,N'-(3,3'-dichloro - p,p' - biphenylene) bis-maleimide, N,N'-p,p'-diphenyl methane-bis-(methylmaleimide); N,N'-p,p'-diphenylmethane-bis - (dimethylmaleimide) which can be made from pyrocinchonic anhydride and 4,4'-diaminodiphenyl methane, etc. Halogenated derivatives of such bis-imides where halogen is on an aryl nucleus can also be employed without departing from the scope of the invention, e.g., N,N'-(3,3'-dichloro-4,4'-biphenyloxy)-bis-maleimide, N,N'-(3,3'-dibromo-4,4' - diphenylmethane)-bis-maleimide, etc. Mixtures of the bis-imides can also be used if desired.

The above bis-imides of Formula II can be prepared by reacting two moles of maleic anhydride (or other methyl-substituted maleic anhydrides required for making the bis-imides of Formula II) with one mole of a suitable diamino compound. Mixtures of anhydrides can be used if desired. Typical of the diamino compound which may be employed for making the bis-imides of Formula II may be mentioned, for instance, meta-phenylene diamine;
para-phenylene diamine;
4,4'-diamino-3,5,3',5'-tetramethyldiphenyl methane,
4,4'-diamino-diphenyl propane;
4,4'-diamino-diphenyl methane;
4,4'-diamino-diphenyl sulfide;
4,4'-diamino-diphenyl sulfone;
3,3'-diamino-diphenyl sulfone;
4,4'-diamino-diphenyl ether;
4,4'-diamino-3,5,3',5'-tetrachloro-diphenyl methane;
1,5-diamino-naphthalene;
3,3'-dimethyl-4,4'-diamino-biphenyl;
3,3'-dimethoxy benzidine;
2,4-bis-(beta-amino-t-butyl) toluene;
bis-1,4-(beta-amino-t-butylphenyl) ether;
para-bis-(2-methyl-4-amino-pentyl) benzene;
para-bis-(1,1-dimethyl-5-amino-pentyl) benzene;
α,α'-diamino-m-xylene;
α,α'-diamino-p-xylene;
bis(4-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-docecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;

and mixtures thereof.

The organic dithiols which can be employed are not critical and can be any one of those which have at least two free thiol (—SH) groups present. Generally, the organic dithiol should be free of primary or secondary aliphatic amino groups. Among such organic dithiols which can be employed are, for instance, 1,2-ethanedithiol
1,3-propanedithiol
2-methyl-2,4-pentanedithiol
1,6-octanedithiol
1,6-hexanedithiol
1,10-decanedithiol
1,18-octadecanedithiol
1,20-eicosanedithiol
1,38-octatriacontanedithiol
3,6-dioxa-1,8-octanedithiol
1,4-di(3-mercaptophenyl)butane
2-mercaptoethyl-3-(2-mercaptoethyl)phenylsulfide
dithioresorcinol
3-(2-mercaptoethyl)-6-(mercaptomethyl)pyridine
2,5-dimercapto-1,3,4-thiadiazole
1,2,4-thiadiazole-3,5-dithiol
ethylene glycol bis-(mercaptoacetate)
beta-mercaptoethyl ether
2-mercaptoethyl sulfide
3,4-dimercaptotoluene
2,3-dimercaptopropanol

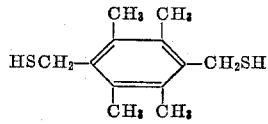

The reaction of the organic dithiol and the bis-imide (or mixtures of bis-imides) may be carried out by merely mixing the ingredients together at room temperature and permitting the reaction to proceed whereby the exothermic heat of reaction may increase the temperature up to 40 to 50° C. Heating in the range of about 50 to 150–200° C. for a length of time required to obtain the desired polymer can also be used if it is desired to accelerate the reaction. Generally, temperatures on the order of about 50° to 150° C. are adequate for the purpose.

Ordinarily, it is desirable to effect reaction between the bis-imide and the organic dithiol in the presence of a solvent which is inert to the reactants and the reaction product and yet is a solvent for at least one of the reactants and certainly for the reaction product. Typical of such solvents which may be employed for the purpose are benzene, xylene, chlorobenzene, trichlorobenzene, cresol (including mixtures of cresols), N-methyl-2-pyrrolidone, dimethylformamide, etc. The choice of solvent is not critical and any one which satisfies the above conditions of inertness and solvation can be advantageously used. On a weight basis, the solvent may comprise from 1 to 50 or more parts of the solvent per part of the reactant or reactants. Generally, it is advisable to dissolve the bis-imide in a suitable solvent and then add the organic dithiol to the solution.

Although the reaction between the bis-imide and the organic dithiol proceeds fairly well under most conditions, I have found that the incorporation of certain catalyst materials markedly improves the rate of reaction and the time in which optimum yields are obtained. Among such catalysts which may be mentioned are, for instance, tertiary amines, for example, triethyl amine, tri-n-butyl-amine, etc. Other catalysts which have been found useful particularly when employing a two-phase emulsion system (in which the monomer is dissolved in a solvent, such as cresol, and the catalyst is dissolved in water and the total mixture emulsified with emulsifying agents such as carboxy methyl cellulose) include sodium carbonate, potassium carbonate, sodium bicarbonate, etc. Generally, when polar solvents such as dimethylformamide, N-methyl-2-pyrrolidone, dimethyl sulfoxide, etc., are employed, catalysts are normally not needed to effect the desired reaction.

The amount of catalysts used can vary widely. Generally, no more should be employed than is necessary to effect optimum completion of the reaction. Ordinarily, no more than 0.01%, by weight, of the catalyst, based on the weight of the bis-imide is required, and usually, amounts of the order of 0.0001% to 0.001%, by weight, of the catalyst, based on the weight of the bis-imide, are sufficient.

The amount of organic dithiol used should be at least equal in molar concentration to the mols of bis-imide employed. Thus, for higher molecular weight products, there should be employed about 1 mol of the organic dithiol per mol of the bis-imide. A slight molar excess of 1.001 or slightly higher of each reactant is not precluded.

After obtaining the polymer which may require reaction for times ranging from about 5 minutes to 2-3 hours or more, the solution of the polymer is treated with a non-solvent such as water or a lower alkanol, such as methanol, to precipitate the polymer and the polymer can then be isolated in well known manners and used for whatever purpose intended. In addition to being soluble in many solvents referred to above, particularly the cresols, these polymers are usually soluble in other solvents such as dimethylformamide (DMF), dimethylsulfoxide, etc. The fact that such polymers are soluble in cresol makes them advantageously useful as coating compositions for electrical conductors whereby the conductor can be passed through the cresol solution of the polymer and the solvent is driven off by heat and the polymer on the conductor core cured at elevated temperatures of the order of about 150–300° C. The polymers obtained in this fashion are usually infusible and insoluble.

In addition to curing the polymer by heat alone, acceleration of the polymer to the thermoset, i.e., the infusible and insoluble state can be accelerated by the employment of small amounts of organic peroxides or other free radical producing agents normally used to accelerate polymerization. Among such organic peroxides may be mentioned, dicumyl peroxide, benzoyl peroxide, tertiary butyl perbenzoate, tertiary butyl hydroperoxide, azo-bis-isobutyronitrile, etc. Generally the amount of cure accelerator employed for the purpose can range from about 0.01 to as high as 5 percent or more, by weight, based on the weight of the polymer.

In addition to the foregoing mixture of ingredients, it is possible to blend the polymer of Formula I with other polymers and resins in amounts ranging from about 1 to 75 percent or more, by weight, of the polymer based on the total weight of the polymer of Formula I and the other polymeric ingredients. Included among such polymers may be mentioned polyolefins (e.g., polyethylene, polypropylene, etc.), polystyrene, polyphenylene oxides such as shown in U.S. 3,306,875, epoxy resins such as shown in U.S. 2,840,540, polycarbonate resins such as shown in U.S. 3,028,365, silicone resins such as shown in U.S. 2,258,218–222, phenol-aldehyde resins, polyimide resins such as shown in U.S. 3,179,633–634, polyarylene polyethers such as shown in U.S. 3,332,909, etc., many of which are well-known and well-documented in the art.

In order that those skilled in the art may better understand how the present invention may be practiced, the following examples are given by way of illustration and not by way of limitation. All parts are by weight unless otherwise stated.

The intrinsic viscosities recited in the following examples were measured in dimethylformamide at 25° C. The cut-through tests recited in these examples were carried out in the manner described in U.S. Pat. 2,936,296 issued May 10, 1960, and assigned to the same assignee as the present invention. Unless otherwise stated, films made from the polymers prepared in the following examples were deposited from solutions of the polymer in dimethylformamide (DMF) whereby the DMF was removed by heating at temperatures in the order of about 100–150° C.

EXAMPLE 1

Into a reaction vessel equipped with a stirrer and thermometer were placed 4.2 grams (0.02 mol) ethylene glycoldimercaptoacetate, 7.16 grams (0.02 mol) BMI and 50 ml. distilled cresol. About 2 drops tri-n-butylamine were added and the reaction allowed to continue at room temperature with stirring for about 3 hours. The viscous reaction mixture which was obtained was isolated by pouring it into 500 ml. methanol containing a small amount of acetic acid. The polymer which precipitated was dried and found to weigh 11.9 grams. Films cast from DMF solutions of said polymer on a glass plate were found to be strongly adherent to the glass surface. The cut-through temperature of these films was about 160° C. and the softening point of the polymer was about 160–170° C. This polymer was composed of recurring structural units of the formula (VI)

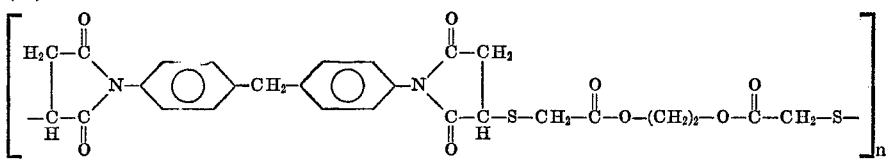

wherein $n$ is a whole number greater than 1.

EXAMPLE 2

Employing the same equipment and procedure as in Example 1, and the same procedure, 7.16 grams (0.02 mol) BMI, and 1.88 grams (0.02 mol) 1,2-ethanedithiol in 50 ml. distilled cresol together with three drops tri-n-butylamine were heated for four hours at around room temperature. The resulting viscous polymer solution was poured into methanol containing a small amount of acetic acid, and the precipitated polymer was removed by filtration, washed with additional methanol and dried to give 9.0 grams of a polymer (99.6% of the theoretical yield) having an intrinsic viscosity of 0.42 dl./gram and a softening point of 195–200° C. This polymer was composed of recurring structural units of the formula (VII)

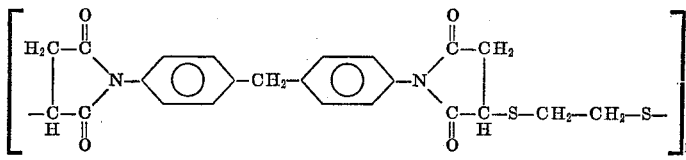

wherein $n$ is a whole number greater than 1.

EXAMPLE 3

Example 2 was repeated in all respects with the exception that the 1,2-ethanedithiol was replaced by 2.1644 grams (0.02 mol) 1,3-propanedithiol. After working up the reaction product, there was obtained 8.9 grams of a dry polymer having an intrinsic viscosity of 0.61 dl./gram and a softening point of 158–162° C. This polymer which could be readily cast into films from DMF solutions was composed of recurring structural units of the formula (VIII)

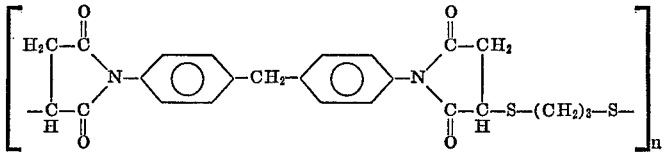

where $n$ is a whole number in excess of 1.

EXAMPLE 4

A polymer having an intrinsic viscosity of 0.24 dl./gram and a softening point of 170–172° C. was obtained by substituting an equivalent molar amount of 1,2-propanedithiol in place of the 1,3-propanedithiol of Example 3.

EXAMPLE 5

When the 1,2-ethanedithiol of Example 2 was replaced with 3.006 grams (0.02 mol) 1,6-hexanedithiol and otherwise using the same conditions of reaction and work up of the polymer, a 10.6 gram yield of a polymer was obtained having an intrinsic viscosity of 0.38 dl./gram and a softening point of about 110° C.

EXAMPLE 6

Employing the same conditions of reaction and work up as in Example 2, 4.08 grams (0.02 mol) 1,10-decanedithiol was substituted in place of the 1,2-ethanedithiol of Example 2 to give 9.7 grams of a polymer which could be cast into tough films from a chloroform solvent. This polymer, which had a waxy feel, had a softening point of 100–105° C. and an intrinsic viscosity of 0.4 dl./gram.

EXAMPLE 7

Employing the same conditions of reaction and work up of the polymer as in Example 2, 2.765 grams (0.02 mol) 2-mercaptoethylether of the formula

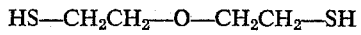

was substituted for the bisthiol of Example 2. The polymer thus obtained in a yield of about 9.2 grams had an intrinsic viscosity of 0.26 dl./gram and a softening point of 132–134° C.

EXAMPLE 8

Employing the same equipment and conditions as in Example 2, 7.20 grams (0.02 mol) N,N'-bismaleimido-4,4'-diphenylether, 1.88 grams (0.02 mol) 1,2-ethanedithiol, 50 ml. cresol and two drops tri-n-butylamine were reacted for about 3 hours at room temperature (about 25–27° C.), the polymer was precipitated by pouring it into methanol containing a small amount of acetic acid, filtered, washed with additional methanol and vacuum dried to give 9.4 grams of a polymer having an intrinsic viscosity of 0.21 dl./gram and a softening point of 174–178° C. This polymer was composed of recurring structural units of the formula (IX)

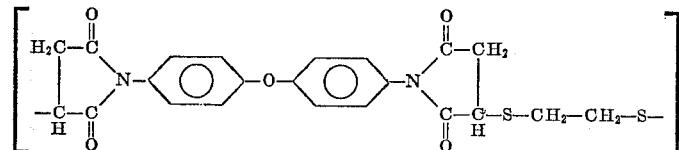

where $n$ is a whole number greater than 1.

In my copending application Ser. No. 163,408 filed concurrently herewith and assigned to the same assignee as the present invention, are disclosed and claimed methods for making polyimidothio ethers by the reaction of bisimides of Formula II with hydrogen sulfide to give polymers composed of recurring units of the formula (IXA)

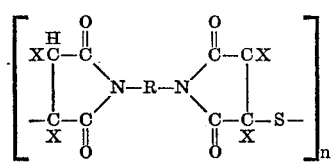

where R, X, and $n$ have the meanings given above in connection with Formula I. I have found that I can make copolymers from the same bisimides with both hydrogen sulfide and organodithiols which has both the units of Formula I and Formula IXA. The following examples show means for obtaining such copolymers.

EXAMPLE 9

Into a reaction vessel equipped with stirrer and thermometer and hydrogen sulfide inlet were placed 30.16 grams (0.02 mol) BMI, 0.94 gram (0.01 mol) 1,2-ethanedithiol and 50 ml. distilled cresol. Two drops of triethylamine were added and the reaction mixture was allowed to stir for about one hour at room temperature. There was considerable exothermic heat generated with the temperature rising from about 25° C. to 48° C. Thereafter, hydrogen sulfide was slowly admitted into the reaction mixture for about one hour at a rate of about one liter per hour. The viscosity of the mixture rose rapidly, and after the addition of the hydrogen sulfide the reaction mixture was allowed to stand for an additional one hour with stirring during which time the viscosity of the reaction mixture became extremely high. About 50 ml. cresol was added to dilute the solution and the reaction mixture was poured into methanol containing a small amount of acetic acid. The precipitated white polymer which was obtained was isolated, washed in methanol and dried to give almost a quantitative yield of polymer having a cut-through temperature of 140° C. and an intrinsic viscosity of 0.66 dl./gram. The structure of the polymer was identified by the following analyses which established that the polymer was composed of recurring structural units of the Formula VII and of the formula (X)

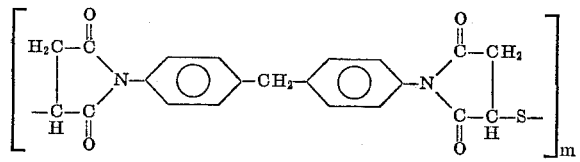

where $m$ is a whole number in excess of 1. The analyses on the polymer were as follows:

Found (percent): C, 62.5; H, 4.2; N, 6.3; S, 10.8.
Calculated (percent): C, 62.7; H, 4.27; N, 6.4; S, 11.0.

A film cast from a solution of the polymer showed a tensile strength of about 11,700 p.s.i. with a 5% elongation.

EXAMPLE 10

When Example 9 was repeated with the exception that a different mol ratio of dithiol to $H_2S$, i.e., 0.47 gram 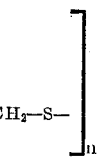 (0.005 mol) ethanedithiol was used in place of 0.94 gram (0.01 mol) 1,2-ethanedithiol of Example 9, and otherwise the procedure and introduction of hydrogen sulfide were the same, a quantitative yield of the polymer having an intrinsic viscosity of 0.57 dl./gram was obtained. The thermogravimetric curves in both air and nitrogen for this polymer showed an initial weight loss of about 10% at 350° C. followed by a steady weight loss at higher temperatures.

The polymers of Formula I can be treated by suitable means to form other polymers containing a sulfone linkage. Thus the polymer of Formula I can be dissolved in a suitable solvent, for instance, benzene, toluene, acetic acid, etc. and thereafter treated with an oxidizing agent employing a sufficient amount of the oxidizing agent to convert each sulfur in the recurring unit of Formula I to the sufone ($SO_2$) grouping. Such polymers will have the general formula (XI)

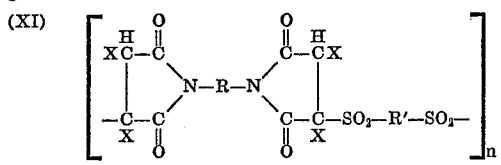

where X, R, R', and n have the meanings given above.

The oxidation reaction is generally conducted by heating the mixture of the polymer of Formula I with the oxidizing agent for a period of time and at a temperature (for example, from 1 to 5 hours at a temperature of from 50° to 100° C.) until the desired polymer is obtained. The polymer can then be worked up and isolated in the same manner as was done in connection with the preparation and isolation of the other sulfur polymers of Formula I.

A typical example whereby a sulfone polymer of Formula XI was obtained is shown by the following.

EXAMPLE 11

About 5 grams of the polysulfide polymer of Example 6 was placed in a reaction vessel equipped with a stirrer. Thereafter, 30 ml. glacial acetic acid was added and then 10 ml. of 30% hydrogen peroxide. The reaction mixture was stirred and heated at 60–65° for about 3 hours. The white polymeric product which was obtained was removed by filtration and dried to give 5.1 grams of a polysulfone polymer composed of recurring structural units of the formula (XII)

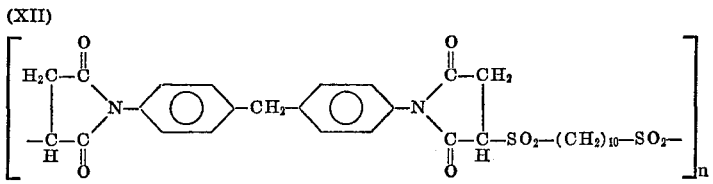

where n is a whole number in excess of 1. This resin had a softening point of 135–140° C. The structure for the polymer was established by NMR.

The crosslinking of a polysulfide polymer as previously described was accomplished as follows. The polysulfide polymer prepared in accordance with Example 6 was milled with 2%, by weight, thereof of dicumyl peroxide and thereafter molded under heat and pressure for about 15 minutes at 250° C. Whereas before molding the polymer was fusible and soluble, after molding, it was rendered hard, infusible and insoluble in all solvents, including DMF, attesting to the fast that it had become crosslinked.

As pointed out previously the reaction between the bis-maleimide and the organic dithiol may be carried out in an emulsion medium. Typically, such an emulsion medium will comprise the bis-maleimide, the organic dithiol, advantageously a catalyst, a proton donor, a solvent (especially one which can also act as a proton donor), and a sufficient amount of water to make the emulsion sufficiently fluid to permit reaction between the reactants, and still allow the formed polymer to be readily dispersed in the emulsion as it is formed. Usual emulsifying agents, such as carboxymethyl hydroxyethyl cellulose, can be employed for forming the emulsion.

Polymers obtained by this emulsion method tend to have higher molecular weights and higher intrinsic viscosities. Problems concerned with the viscosity of the reaction medium are usually avoided since the polymer is in the form of suspended, very fine particles in a nonviscous medium. Emulsions of the polymers are stable for long periods of time and could be employed for many applications in this physical state.

The following example illustrates a method for carrying out the reaction in emulsion form.

EXAMPLE 12

To a reaction vessel equipped with a thermometer and stirrer were added 0.01 mol (3.58 grams) BMI, 0.01 mol (2.1 grams) ethylene glycol dimercaptoacetate and 30 ml. cresol. The reaction mixture was heated slightly to about 40° C. to dissolve all the components and then 40 ml. distilled water and 25 ml. of a suspension of 0.5 gram carboxymethyl hydroxyethyl cellulose 25 ml. water were added. Agitation was begun to emulsify the aqueous and cresol layers. Two drops of tri-n-butyl amine were then added and agitation continued for about two hours. The light orange-red solution which was obtained was poured into methanol containing a few drops of acetic acid. The polymer which was present in the emulsion in a finely divided form, separated as a slightly off-white powder, was filtered, washed and dried to give the same polymer composed of recurring structural units as in Formula VI.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present compositions or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant, pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenol-aldehyde resins, urea-aldehyde resins, alkyd resins, etc.; cellulosic material such as paper, inorganic and organic esters of cellulose such as cellulose acetate; cellulose ethers, such as methyl cellulose, ethyl cellulose, benzyl celluose, etc. In some instances, plasticizers and other modifying agents may be used in combination therewith to yield products which when applied to a base member and air dried or baked have a high degree of heat-resistance due to the presence of the compositions herein defined.

It will of course be apparent to those skilled in the art that in addition to the compositions specifically referred to in the foregoing examples, other organic dithiols, bisimides of Formula II, solvents, catalysts, proton donors, etc., many examples of which have been described above, may be employed without departing from the scope of the invention. The processing techniques may be varied widely employing the many conditions recited previously.

What I claim as new and desire to secure by Letters Patent of the United States is:

1. A film-forming composition of matter composed of recurring structural units of the formula

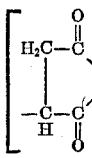

where X is a member selected from the class consisting of hydrogen and the methyl radical, R is a divalent organic radical selected from the class consisting of divalent hydrocarbon radicals of from 1 to 40 carbon atoms and divalent groups consisting of two aryl radicals attached to each other through the medium of a member selected from the class consisting of an alkylene radical of from 1 to 10 carbon atoms, —S—, —SO$_2$—, $$-\overset{O}{\underset{\|}{C}}-$$

and —O—, R' is a divalent aliphatic radical, $n$ is a whole number in excess of 1.

2. A composition as in claim 1 composed of recurring structural units of the formula

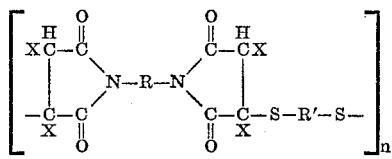

where $n$ is a whole number greater than 1.

3. A composition as in claim 1 composed of recurring structural units of the formula

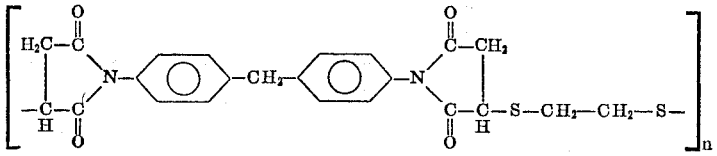

where $n$ is a whole number in excess of 1.

4. A composition as in claim 1 composed of recurring structural units of the formula

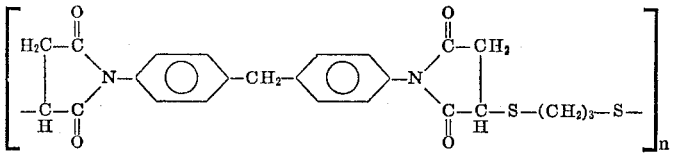

where $n$ is a whole number greater than 1.

5. A composition as in claim 1 composed of recurring structural units of the formula

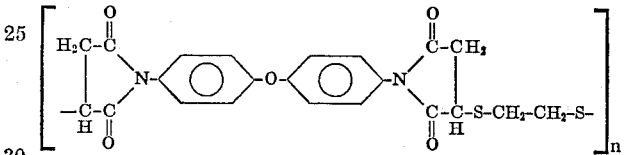

and units of the formula

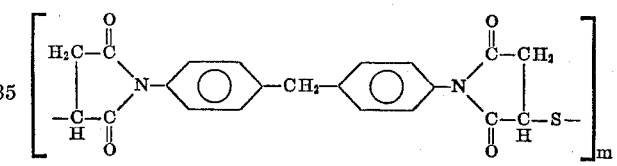

where $m$ and $n$ are whole numbers in excess of 1.

6. A film-forming composition composed of the recurring structural units of the formula

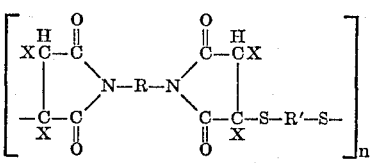

and units of the formula

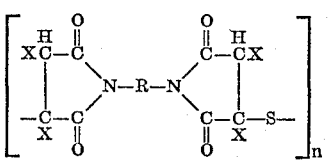

where X is a member selected from the class consisting of hydrogen and the methyl radical, R is a divalent organic radical selected from the class consisting of divalent hydrocarbon radicals of from 1 to 40 carbon atoms and divalent groups consisting of two aryl radicals attached to each other through the medium of a member selected from the class consisting of an alkylene radical of from 1 to 10 carbon atoms, —S—, —SO$_2$—, $$-\overset{O}{\underset{\|}{C}}-,$$

and —O—, R' is a divalent aliphatic radical, and $n$ is a whole number in excess of 1.

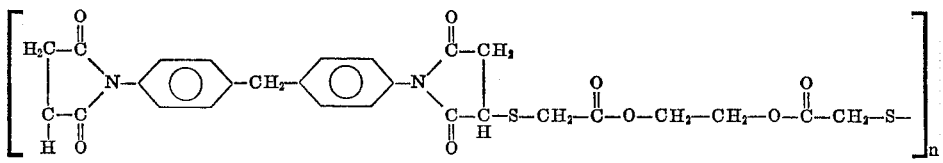

7. The process for making film-forming polymers composed of recurring structural units of the formula

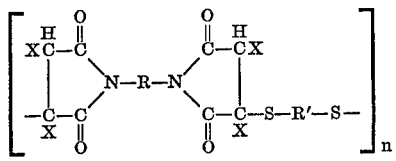

which process comprises effecting reaction in the presence of a proton donor between a bisimide compound of the general formula

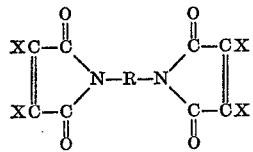

and an organic dithiol of the general formula

HS—R'—SH where X is a member selected from the class consisting of hydrogen and the methyl radical, R is a divalent organic radical selected from the class consisting of divalent hydrocarbon radicals of from 1 to 40 carbon atoms and divalent groups consisting of two aryl radicals attached to each other through the medium of a member selected from the class consisting of an alkylene radical of from 1 to 10 carbon atoms, —S—, —SO$_2$—,  and —O—, R' is a divalent organic radical and $n$ is a whole number in excess of 1, where the proton donor is present in an amount equal to at least 0.5 percent, by weight, based on the weight of the bisimide compound.

8. The process as in claim 7 wherein the reaction is carried out in the presence of a catalyst for the reaction selected from the class consisting of tertiary amines, sodium carbonate, potassium carbonate, and sodium bicarbonate.

9. The process as in claim 7 wherein the bis-maleimide is N,N'-p,p'-dimethylmethane bis-maleimide.

10. The process as in claim 7 wherein the organic dithiol is ethylene glycol dimercaptoacetate.

11. The process as in claim 7 wherein the organic dithiol is 1,2-ethanedithiol.

12. The process as in claim 7, wherein the organic dithiol is 1,3-propanedithiol.

13. The process as in claim 7 wherein the proton donor is cresol.

References Cited
UNITED STATES PATENTS 2,971,944   2/1961   Chow et al. _____ 260—78 UA
3,533,996   10/1970  Grundschober et al.
                                     260—78 UA HAROLD D. ANDERSON, Primary Examiner U.S. Cl. X.R 117—161 P, 161 UN; 260—17 R, 17.4 R, 30.8 DS, 32.6 N, 33.4 R, 41 R, 47 CZ, 47 UA, 63 R, 874, 897, 900